MICHAEL SHERMAN
INVENTOR.
BY
ATTORNEY

Sept. 11, 1962 M. SHERMAN 3,054,064

D.-C. OUTPUT FREQUENCY DISCRIMINATORS USING LAG LEAD PHASE SHIFT NETWORKS, SAMPLING, AND AVERAGING CIRCUITS

Filed Feb. 12, 1958 2 Sheets-Sheet 2

MICHAEL SHERMAN
INVENTOR.

BY Frederick M. Arbuckle agent
Morris Spector,
ATTORNEY

United States Patent Office 3,054,064
Patented Sept. 11, 1962

3,054,064

D.-C. OUTPUT FREQUENCY DISCRIMINATORS USING LAG LEAD PHASE SHIFT NETWORKS, SAMPLING, AND AVERAGING CIRCUITS

Michael Sherman, San Pedro, Calif., assignor, by mesne assignments, to Thompson Ramo Wooldridge Inc., Cleveland, Ohio, a corporation of Ohio Filed Feb. 12, 1958, Ser. No. 714,753
14 Claims. (Cl. 329—137)

The present invention relates to improvements in frequency discriminator circuits and relates more particularly to improved arrangements for faithfully detecting frequency changes in frequency modulated signal carriers in which the magnitude or degree frequency change to be detected is of a value closely approximating the mean frequency of the carrier itself.

In the prior art, numerous electronic circuit arrangements have been developed for detecting changes in the frequency of a signal carrier subject to frequency change as a function of some form of signal intelligence. In general, such arrangements have employed tuned circuits or other resonant elements which operate upon the frequency modulated signal in various ways to develop a direct current output signal indicative of the extent to which the frequency of the signal differs from a chosen frequency of resonance. These types of prior art frequency discriminator circuits are found to be of most value at relatively high operating frequencies, since, the physical size and weight of inductors required to form resonant circuit elements become increasingly larger with decreasing operating frequencies.

Moreover, in prior art arrangements, the effective range of frequency shift which frequency discriminator circuits have been capable of detecting on a linear basis, has been generally limited to several percent of the mean frequency of the signal carrier. Again, as the frequency of the signal carrier itself is lowered, the linearity and sensitivity of prior art circuits, in detecting large changes in the frequency of the signal carrier, have suffered.

The present invention provides a novel arrangement of light-weight non-resonant elements, such as resistive-capacitive networks, which permits the linear detection of frequency changes in relatively low frequency signals over a range of frequency change which can be as much as 80% of the nominal or mean frequency of the signal carrier. The present invention further provides a novel arrangement of non-resonant elements for accomplishing frequency discriminatory action which permits considerable flexibility in controlling or shaping the over-all frequency shift response curve of a discriminator and affords novel means, not heretofore known in the prior art, for realizing surprisingly high sensitivities in the carrying out of the frequency discriminative function.

In one of its more general forms, the present invention employs two cooperating and complementary signal transducing channels which separately process a given frequency modulated carrier signal. The first signal transducing channel is, preferably through the use of non-resonant circuit elements, made to have an amplitude attenuation and phase shift characteristic which for example acts to attenuate the carrier signal as a direct function of frequency while shifting the phase of the carrier signal as an inverse function of frequency. The second signal transducing channel, on the other hand, is, through the use of non-resonant elements, made to have an amplitude attenuation and phase shift characteristic which functionally complement that of the first channel by, for example, attenuating the signal carrier as an inverse function of frequency while imposing a phase shift thereon which is a direct function of frequency. By vectorially combining the output signals from each channel, a resultant signal is developed which, when periodically sampled, is made to yield an output signal the magnitude of which varies as a function of frequency changes in the signal carrier.

The present invention also contemplates novel means for increasing the effectiveness and/or sensitivity of this general form of the invention by providing means for advancing and retarding the sampling interval as a function of the frequency of the signal carrier. Alternatively, increased effectiveness in this is made possible by providing means acting on the resultant signal itself to shift its phase as a function of the signal carrier frequency. Furthermore, by employing both of these latter techniques in the proper control relationship with respect to frequency change, a surprising degree of improvement in frequency discriminatory sensitivity is realized.

A better understanding of the present invention and its many features of advantage will be obtained through a reading of the following specification, especially when taken in connection with the accompanying drawings, in which.

Figure 1:
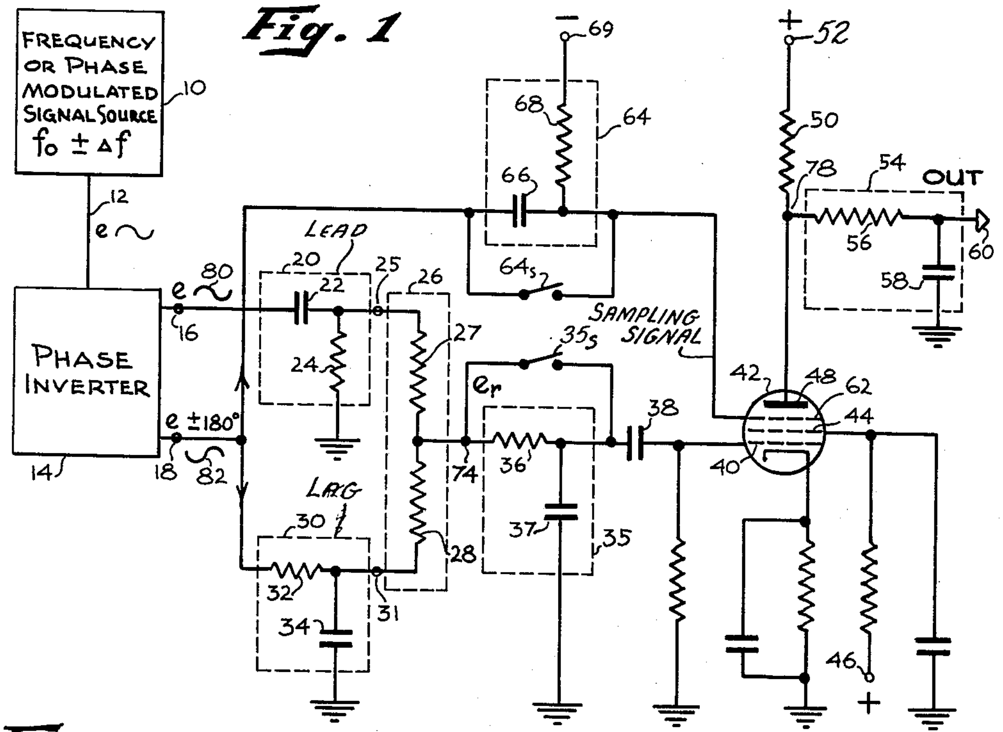
FIGURE 1 is a combination block and schematic representation of one form of the present invention.

Turning now to FIGURE 1 there is indicated by the block 10 a source of alternating current signal having a nominal frequency $f_0$ which is frequency or phase modulated by an intelligence signal between the frequency limits $f_0 \pm \Delta f$. This frequency modulated signal, which may be thought of as a signal carrier, is represented beside the lead line 12 by the alphabetical designation "*e*." By way of example the signal, "*e*," is shown to be coupled to a phase inverter 14 having output terminals at 16 and 18, respectively. It will be assumed that the version of signal "*e*" appearing at terminal 16 is in phase with the signal "*e*" as applied to the input of the phase inverter 14, while that version of signal "*e*" appearing at terminal 18 is shifted ±180° with respect to the input signal "*e*." The signal appearing at terminal 16 is in turn applied to a frequency sensitive phase and amplitude modifying network indicated by the dotted line rectangle 20 which may be comprised of nothing more than a capacitor 22 and a resistor 24. The output signal from the network 20, made available at terminal 25, is applied to one input terminal of a combining circuit indicated by dotted line rectangle 26. The network 26 may be comprised of simply two series connected resistors 27 and 28. Similarly, the output signal appearing at terminal 18 of the phase inverter is applied to a frequency sensitive phase and amplitude modifying network, indicated by the dotted line rectangle 30. By way of example network 30 may be comprised of a resistor 32 and a capacitor 34. The output signal from the network 30, made available at terminal 31, is also applied to the combining circuit 26.

Output signal from the combining circuit 26 is then coupled to a frequency sensitive phase shifting network shown in dotted line rectangle 35 which may, as shown, comprise a resistor 36 and capacitor 37. The signal delivered by the phase shifting network 35 is shown capacitively coupled, via capacitor 38, to the control grid 40 of a pentode vacuum tube 42. The vacuum tube 42, as will later be seen, is connected for operation as a signal gating circuit which performs a sampling function upon the signal applied to the control electrode 40. For this purpose, the screen electrode 44 is connected through a suitable de-coupling network to a source of positive potential having its positive terminal indicated at 46. The anode 48 of the pentode on the other hand, is connected through a load resistor 50 to a source of potential having its positive terminal indicated at 52. It will be understood, throughout this specification, that all power supply terminals represent voltage sources referenced with respect to a common circuit ground. Output signals, developed across load resistor 50 at the anode 48, are in turn applied to an integrating or averaging network indicated by the dotted rectangle 54 and which may comprise a resistor 56 and shunt capacitor 58. An output signal from the integrating network 54 is made available at an output terminal 60.

In order to operate the gate circuit represented by the vacuum tube 42 with its associated circuit connections, the suppressor electrode 62, of the pentode, is, by way of example, supplied with a signal derived from output terminal 18 of the phase inverter 14. This signal is shown to be applied through a phase shifting network indicated within the dotted line rectangle 64 which may comprise a capacitor 66 and resistor 68. Resistor 68 is returned to a negative potential source having a terminal 69. The magnitude of this negative potential is made sufficient to normally cut-off anode current flow in tube 42.

In order to best understand the principles underlying the operation of the present invention, it will be convenient to consider that a portion of the phase inverter 14, taken in combination with the network 20, constitutes a first signal transducing channel for the input signal "*e*," while a complementary portion of the phase inverter 14, taken in combination with the network 30, constitutes a second signal transducing channel for the signal "*e*." With this in mind it can be seen that the output of the two signal transducing channels, which may be considered as appearing at the terminals designated at 25 and 31, respectively, are combined by the combining network 26 to form a resultant signal "$e_r$" appearing at terminal 74. This resultant signal is then applied to a gate circuit, such as the arrangement of the pentode 42, which effectively samples the value of the resultant signal during periods defined by the input signal "*e*." The output of the gate circuit available at terminal 78 is then applied to an averaging circuit such as that shown at 54 which averages the value or values of the samples taken from the resultant signal.

In accordance with the present invention, the first signal transducing channel is, by means of the network 20, made to have a transducing characteristic which alters both the amplitude and phase of the signal "*e*" as a function of frequency. On the other hand the signal transducing characteristic of the second transducing channel is, by means of the network 30, made to impose amplitude and phase shift changes upon the signal "*e*" which are complementary to those enforced by the first transducing channel.

In a preferred form of the present invention the first signal transducing channel is made to have a transducing characteristic substantially corresponding to that of a high pass filter. This may be accomplished by employing non-resonant elements in the network 20 comprising, as above described, a capacitor 22 and resistor 24. These elements comprise one form of what is commonly referred to a "lead" circuit. This form of "lead" circuit has well known frequency response and phase shift characteristics which provide at the output terminal 25 a signal which increases in amplitude as signal frequency increases, while at the same time imposing a "leading" phase shift upon the input signal which increases in magnitude as frequency decreases. In the specific example being considered, the second signal transducing channel is made to have a transducing characteristic corresponding to that of a low pass filter. This may be accomplished by employing non-resonant elements in the network 30 comprising a series resistor 32 and shunt capacitor 34. Under these conditions the network 30 may be considered a "lag" network. This network produces increasing attenuation of its input signal as frequency increases while producing a greater magnitude of lagging phase shift as frequency increases. By adjusting the relative values of capacitor 22 and resistor 24 in the network 20, and the values of resistor 32 and capacitor 34 in the network 30, a common "cross-over frequency" may be realized at a value $f_0$. At this cross-over frequency, which corresponds to what is termed the "half power point of each network," a 45° phase shift will be imposed upon the signals applied to each network. Thus at frequency $f_0$ the signal appearing at terminal 25 at the output of the network 20 will be 45° ahead of the signal applied to, or appearing at terminal 16, while the signal appearing at terminal 31 at the output of the network 30 will be 45° behind the signal appearing at terminal 18. With the high pass filter type "lead" circuit and the low pass "lag" circuit shown, the amplitudes of the signals appearing at terminals 25 and 31, for the frequency $f_0$, will be .707 of the amplitudes of the signals appearing at terminals 16 and 18, respectively.

With the foregoing phase and amplitude relationships in mind, and remembering that the signal applied to the lag network 30 is initially 180° displaced from the signal applied to the lead circuit 20, vectorial combination of the signals appearing at terminals 25 and 31 produces a resultant signal at terminal 74, the phase of which will be 90° displaced with respect to both versions of the input frequency modulated signal "*e*."

This relationship between the frequency modulated signal carrier, "*e*," the output signals delivered by the networks 20 and 30 as well as the output of the combining network 26, may be more clearly visualized by reference to FIGURES 2*a*, 2*b* and 2*f*. The signal "*e*" applied to the input phase inverter 14 and appearing in the same phase relationship at the output terminal 16 of the phase inverter 14, is illustrated by waveform 80 in FIGURE 2*a*. The phase inverted version of the signal "*e*," appearing at terminal 18 and applied to the network 30, is represented by the waveform 82 in FIGURE 2*b*.

Figure 2:
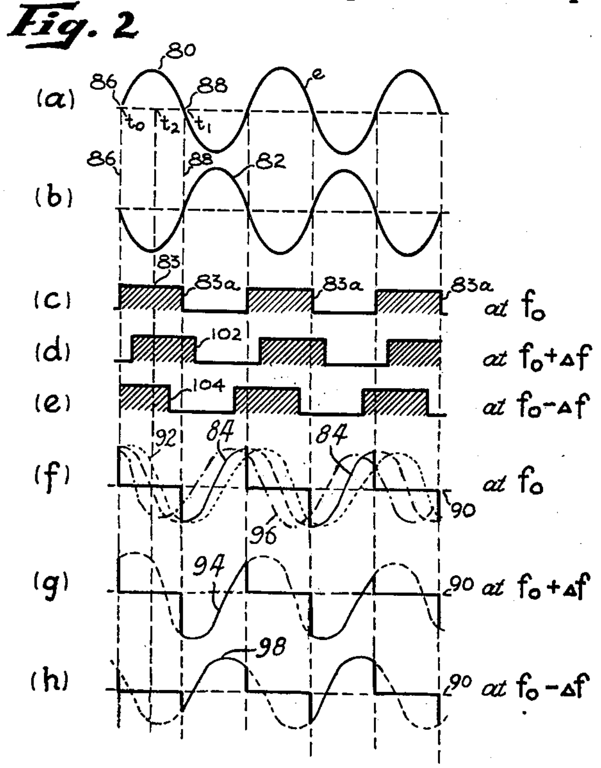
FIGURE 2 is a graphical presentation of various electrical waveforms shown at *2a*, *2b*, *2c*, *2d*, *2e*, *2f*, *2g* and *2h* which aid in the understanding of the operation of the present invention when, for example, embodied in an arrangement of the type illustrated in FIGURE 1.

For convenience the waveforms 80 and 82 have been generally indicated at 80 and 82 in FIGURE 1. The signal 80 after being advanced 45° and combined in the combining circuit 26 with the 45° retarded version of signal 82 will produce a resultant signal $e_r$ shown by the waveform 84 in FIGURE 2*f*. The waveform 84 will be seen to be depicted partly by a solid line and partly by a dashed line for purposes of illustration as will hereinafter appear. Thus if reference time $t_0$ shown by the vertical dashed line 86, acting as a reference to all of the waveforms shown in FIGURE 2, is permitted to represent a zero crossing time of the wave 80, and time $t_1$ represented by dashed line 88 represents the next zero crossing of this wave, it will be seen that the resultant waveform, $e_r$, at 84 in FIGURE 2*f* will have its zero crossing midway between $t_0$ and $t_1$ at $t_2$. This represents the aforementioned 90° displacement of the resultant wave $e_r$ with respect to the input or signal carrier at its means frequency, $f_0$.

In considering the basic mode of operation by which frequency discriminatory action is provided in the embodiment of the present invention shown in FIGURE 1, the influence of the phase shifting networks 35 and 64 will initially, not be considered. For this purpose shunting switches 35*s* and 64*s* may be considered closed. In fact, as it will later become evident, the function of these networks is only to enhance or exaggerate the novel frequency discriminatory action of the present invention. Thus the gate circuit base on pentode 42 may be considered as directly operated by the signal "*e*" shown at 82 in FIGURE 2*b* and available at terminal 18 in FIGURE 1. The resultant signal $e_r$ is therefore periodically sampled during sampling intervals each of a duration substantially one half the period of the signal carrier "*e*" at 82. These sampling intervals are graphically depicted by curve 83 in FIGURE 2*c*, the shaded areas representing the times during which no sample is being taken, i.e., no anode current flow in the pentode 42. Under these conditions, and at frequency $f_0$ the average value of output signal from the sampler or coincidence circuit, appearing at terminal 78 in FIGURE 1, will be zero. This is shown by the waveform 84 in FIGURE 2*f*, the excursions of which, during each sampling interval define equal areas above and below the A.C. axis 90. A nominal D.C. potential of course appears at terminal 78 by virtue of the connection of the anode 48 of pentode 42 to the power supply 52. This nominal D.C. value of potential is not regarded as frequency discriminatory information, but merely establishes the axis 90 (FIG. 2*f*) at some mean D.C. potential relative to circuit ground.

Should now, the frequency of signal carrier be increased from $f_0$ by an amount $\Delta f$, the signal appearing at the output of the "lead" circuit 20 and at terminal 25 will be retarded in phase while its amplitude will increase. On the other hand the phase of the signal appearing at the output of the "lag" network 30 i.e., at the terminal 31, will be retarded and its amplitude decreased. The vectorial addition of these two signals in the combining network 26 will produce a resultant signal $e_r$ which is retarded in phase relative to the resultant signal produced for a frequency $f_0$. This is depicted in FIGURE 2*f* by the dotted line waveform curve 92. Sampling of the resultant signal 92 now results in a waveform such as shown by solid line curve 94 in FIGURE 2*g*. It will be seen by examining the curve 94 that a greater area exists below the axis 90 than above this axis. This will result in a reduction in the current through the load resistor 50 in FIGURE 1, and the positive potential at terminal 78, will rise. Thus as the frequency of the carrier is increased the potential at terminal 78 will increase.

Contrariwise a reduction in the frequency of the signal carrier from $f_0$, by an amount $\Delta f$, will cause the resultant signal applied to the sampler to advance in phase as illustrated by the dash-dot line curve 96 in FIGURE 2*f*. The waveform appearing at terminal 78 at the output of the sampler will then appear as shown in FIGURE 2*h* by the solid line curve 98. The area defined by excursions of this curve is predominantly greater above the axis 90 than below this axis. Current through the resistor 50 (FIG. 1) will therefore increase and cause the average potential of the output terminal 78 in FIGURE 1 to drop. Thus as the frequency of the carrier decreases the D.C. potential appearing at terminal 78 will decrease. If then the time constant of the integrating network 54 is made sufficiently long in FIGURE 1, there will appear at the output terminal 60, a D.C. potential the magnitude of which will vary as a function of the frequency of the signal frequency modulated carrier "*e*."

By establishing the characteristics of the first and second transducing channels shown in FIGURE 1 so that the half power points of the networks occur at the mean frequency, $f_0$, of the frequency modulated carrier signal, a very linear response characteristic for the frequency discriminator can be obtained. In practice, it can be shown that with the embodiment of the present invention shown in FIGURE 1, extremely good linearity can be realized for frequency changes in the signal carrier embracing a range substantially equal to 80% of the mean signal carrier frequency. Another feature of advantage peculiar to the present invention rests in the ease with which the response characteristic of the frequency discriminator may be tailored to suit particular needs that may arise. By altering the phase and amplitude characteristics of the two transducing channels, as for example by modifying the design of the networks 20 and 30 shown in FIGURE 1, a variety of useful frequency response versus signal output characteristics can be obtained.

In accordance with another aspect of the present invention, the over-all sensitivity of a frequency discriminator circuit embodying the principles of operation discussed in connection with the arrangement of FIGURE 1, may be increased by either or both of two novel techniques. The first of these techniques may be embodied in the arrangement of FIGURE 1 through the use of the phase shifting network 35 by opening the switch 35*s*. As described hereinbefore, this network comprised of resistor 36 and capacitor 37 constitutes a low pass filter network. In accordance with the present invention this network is so designed as to impose a frequency selective phase shift upon the resultant signal appearing at terminal 74. The effect of this frequency selective phase shift will be to enhance the change in the distribution of areas defined by the excursions of sampled portions of the resultant signal, caused by a given frequency change. This may be clearly seen by reference to FIGURE 2*f*. If the network 35 in FIGURE 1 is designed to produce substantially 45° lagging phase shift of the resultant signal $e_r$, at the nominal frequency $f_0$, then as frequency is increased the resultant signal, represented as 84 in FIGURE 2*f*, will tend to shift to the right in the figure. This will enhance or exaggerate the shift in the waveform 84 to a point substantially to the right of the position indicated by curve 92, (which as above described is produced without the influence of the phase shift network 35). The result will be that the sampled output signal will have a predominantly greater area below its axis than that shown in FIGURE 2*g*. This will produce a more positive potential appearing at the output terminal 78 of the sampler in FIGURE 1. On the other hand should frequency decrease, the resultant signal will effectively be advanced in phase. The output curve 98 in FIGURE 2*h*, being effectively advanced in phase to result in a greater percentage of area above the axis than that shown in FIGURE 2*h* will produce a greater value of negative potential at the output terminal 78 of the sampler.

In further accordance with the present invention the sensitivity of the circuit in detecting frequency changes can be enhanced by advancing the gating interval in time as frequency increases. In FIGURE 1 the network 64 when switch 64*s* is opened, provides this function. Network 64 is shown as a lead type network. The effect of this network, and the result obtained by its control of the gating interval timing as a function of frequency, can best be seen through reference to FIGURES 2*c*, 2*d* and 2*e*. The description thus far has proceeded upon the assumption that the gating interval has been fixed with respect to the zero crossings of the signal carrier. If however, as indicated in FIGURE 2*d*, by the graph or curve 102, the "on" time of the sampler is advanced in phase relative to the received signal carrier, the result will be substantially the same as having retarded the resultant signal as a function of frequency. On the other hand as shown in FIGURE 2*e*, if the sampling interval is retarded with respect to the input carrier as frequency decreases, this will have the same effect as advancing the phase of the resultant signal as frequency increases. By imposing frequency selective phase shifting upon the resultant signal in one direction as a function of frequency, and frequency selective phase shifting of the sampling interval in the opposite direction as a function of frequency, the effective sensitivity of the discriminator circuit shown in FIGURE 1 can be increased. It will be understood that if the characteristics of the networks 20 and 30 in FIGURE 1 are interchanged, so that the network 20 becomes a lag network and the network 30 becomes the lead type of network, the functions of networks 64 and 35 will be necessarily interchanged also.

Figures 3, 4:
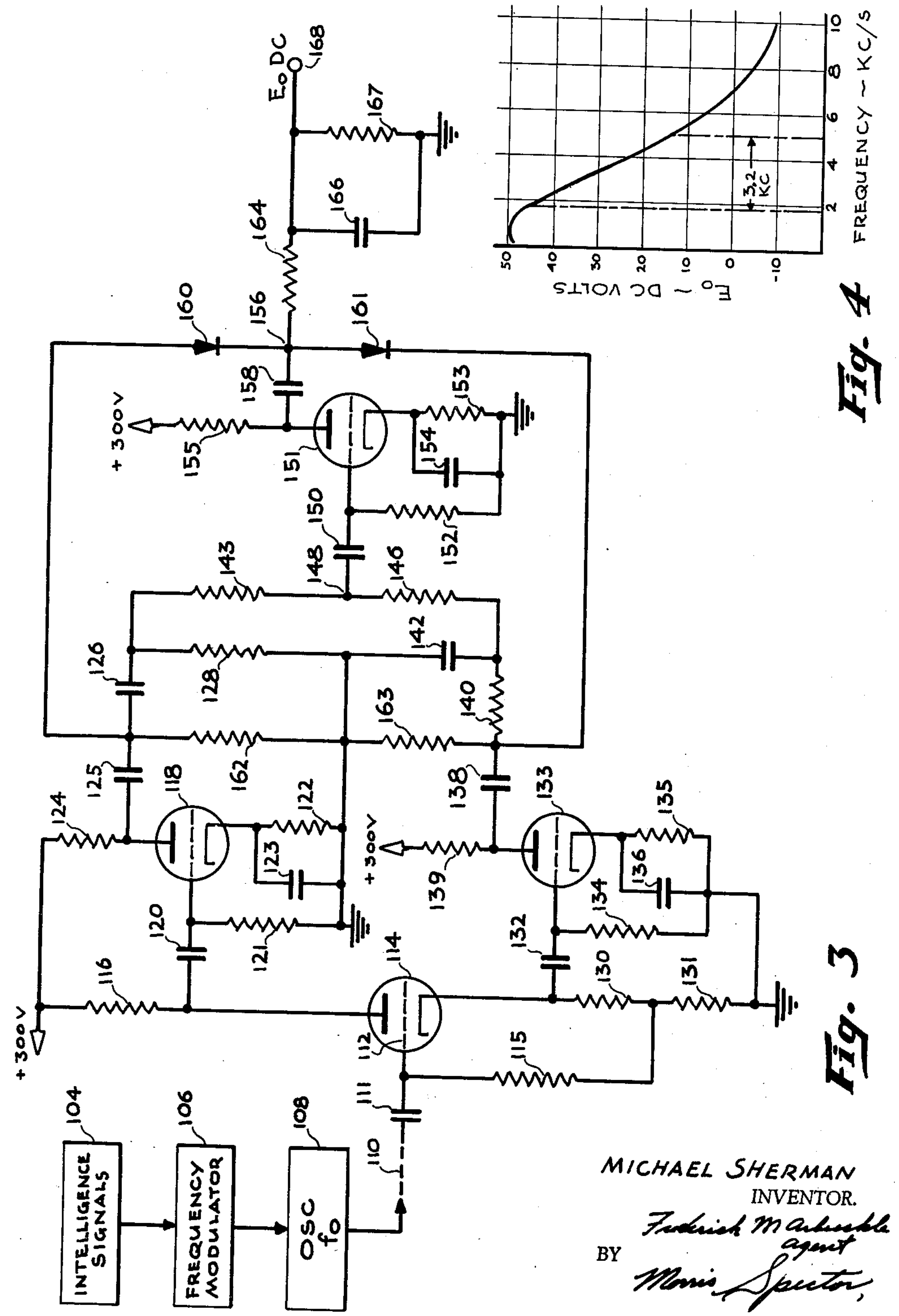
FIGURE 3 is a combination block and schematic representation of a preferred form of frequency discriminator embodying some of the novel features of the present invention.
FIGURE 4 is a graphical presentation of the over-all frequency discriminatory characteristics of a typical embodiment of the invention as for example shown in FIGURE 3.

Another embodiment of the present invention is shown in FIGURE 3. Here an intelligence signal source 104 is shown operatively connected to a frequency modulator 106 which operates to modulate the frequency of an oscillator 108. The frequency modulated signal, having a nominal frequency $f_0$, is conveyed to the frequency discriminatory circuit of the present invention by some suitable transducing means generally indicated by the dotted line 110 and capacitor 111. The frequency modulated signal is applied to the control electrode 112 of the phase inverter stage based upon the vacuum tube 114. A return resistor for the control electrode is shown at 115. Across the anode load resistor 116 of the phase inverter, there will then appear a phase inverted version of the input signal. This is applied to a first signal transducing channel based upon vacuum tube 118 through coupling capacitor 120. A control electrode return resistor 121 is shown connected between the grid of tube 118 and circuit ground. A cathode bias resistor and by-pass capacitor at 122 and 123, are also provided. The signal appearing across the load resistor 124 connected to the anode plate circuit of amplifier tube 118, will then be in phase with the input signal applied to the phase inverter. This "in phase" signal is applied through coupling capacitor 125 to a "lead" phase shifting network comprising capacitor 126 and resistor 128. This network is made to have a characteristic corresponding to that of a high pass filter with its half power point established at the nominal frequency $f_0$.

The "in phase" output signal from the phase inverter stage, which appears across the cathode load impedance, comprising resistors 130 and 131, is applied via capacitor 132, to a second signal transducing channel based upon the amplifier tube 133. Input load resistor 134, cathode resistor 135 and cathode by-pass capacitor 136 are shown connected with tube 133. The output signal from this amplifier stage, appearing across the anode load resistor 139 connected thereto, will be 180° out of phase with the input signal to the phase inverter. This signal is capacitively coupled via capacitor 138 to a lag producing network comprised of a resistor 140 and a capacitor 142. This network is essentially a low pass filter designed to have its half power point at frequency established at the nominal frequency of the oscillator $f_0$. Resistors 143 and 146 connected to the common terminal 148 act as a combining circuit for combining the output signals from the two networks. The signals appearing at terminal 148 in FIGURE 3 corresponds generally to the signal appearing at terminal 74 in FIGURE 1. The resultant signal is, in FIGURE 3, capacitively coupled via a capacitor 150 to the control electrode of amplifier tube 151. A return resistor 152 is provided for the control electrode and a cathode biasing network comprised of resistor 153 and shunt capacitor 154 is connected with the cathode of the tube 151. An output signal from the anode load resistor 155 connected with the anode of tube 151, is in turn capacitively coupled to a sampling point 156 via capacitor 158.

Sampling of the resultant signal in the embodiment of the invention shown in FIGURE 3 is accomplished through the use of diodes 160 and 161 with associated load resistors 162 and 163. These diodes are so polarized and connected to the output circuits of amplifier tubes 118 and 133 as to be rendered conductive during positive going half cycles of the frequency modulated carrier as it is applied to the input of the phase inverter tube 114. Thus during positive going half cycles of the frequency modulated carrier the sampling point 156 will be brought to substantially ground potential. This of course assumes a balance between the amplitudes of the signals applied to each of the diodes 160 and 161. During negative half going cycles of the signal carrier the diodes 160 and 161 are nonconducting permitting the sampling point 156 to assume the potential of the resultant signal as amplified by the vacuum tube 151. An integrating network comprised of resistor 164, capacitor 166 and resistor 167, smooths out or averages the sample pulses appearing at the sampling terminal 156 to provide an output voltage at terminal 168, the value of which is a function of the frequency of the applied modulated carrier.

The graphical presentation shown in FIGURE 4 depicts a typical function of output voltage versus frequency which the general circuit arrangement shown in FIGURE 3 is capable of producing. Where the circuit components of the embodiment shown in FIGURE 3 are as follows, the quantities depicted by the curve of FIGURE 4 may be realized. Drawing index numerals will be referred to in identifying the components, preceded by R or C, designating resistance or capacitance as the character of each component indicates.

Tubes 114, 118, 133, 151 are type 5814 (General Electric):

| | |
|---|---|
| R115=470,000 ohms | R164=100,000 ohms |
| R116=22,000 ohms | R167=1,000 ohms |
| R122=8,200 ohms | C111=.1 microfarads |
| R124=100,000 ohms | C120=.1 microfarads |
| R128=150,000 ohms | C123=10 microfarads |
| R130=1,500 ohms | C125=.1 microfarads |
| R131=20,000 ohms | C126=200 micro microfarads |
| R134=470,000 ohms | |
| R135=8,200 ohms | C132=.1 microfarads |
| R139=100,000 ohms | C136=10 microfarads |
| R140=150,000 ohms | C138=.1 microfarads |
| R143=220,000 ohms | C142=200 micro microfarads |
| R146=220,000 ohms | |
| R152=1,000 ohms | C158=.1 microfarads |
| R153=8,200 ohms | C166=.47 microfarads |
| R163=150,000 ohms | |

The curve of FIGURE 4 shows that the frequency discriminator circuit of FIGURE 3 provides substantially linear response over a frequency range of 3.2 kilocycles with a nominal carrier frequency of about 3.4 kilocycles. The point of zero output, that is the frequency for which zero output potential is developed at the output terminal 168 in FIGURE 3, can of course be adjusted by controlling the values of load resistors 124 and 139 for vacuum tubes 118 and 133. The frequency for zero output voltage can also be adjusted by controlling the time constants of the "lead" and "lag" networks comprised of capacitor 126 and resistor 128 in one channel and resistor 140 and capacitor 142 in the other channel.

I claim:

1. A frequency discriminatory circuit for detecting changes in the frequency of an alternating current frequency modulated intelligence signal, comprising in combination: input terminal means designated to accept said intelligence signal; means, including a high pass non-resonant filter means, coupled with said input terminal means for developing a first version of said intelligence signal, the characteristics of said high pass filter means being such that said first version is attenuated in amplitude as an inverse function of frequency while having imposed thereon a phase shift the magnitude of which is an inverse function of frequency; means, including a low pass non-resonant filter means, coupled with said input terminal means for developing a second version of said signal, the characteristics of said low pass filter means being such that the amplitude of said second version is attenuated as a direct function of frequency while having imposed thereon a phase shift the magnitude of which is a direct function of frequency; means vectorially combining said first and second versions on a linear basis to form a resultant signal, the phase and amplitude of which is a function of said first and second versions of said intelligence signal; and means for averaging the value of said resultant signal over successive intervals each corresponding to substantially one-half cycle of said intelligence signal at any frequency assumed thereby.

2. A frequency discriminatory circuit for detecting frequency changes in a frequency modulated intelligence signal, comprising in combination: input terminal means for accepting said intelligence signal; a first and second signal processing channels each having input terminals and output terminals; means operatively connecting the input terminals of each of said signal processing channels to said input terminal means; non-resonant means operatively included in said first signal processing channel for imposing on said intelligence signal a phase shift the magnitude of which is an inverse function of frequency and limited to 90° and an attenuation which is an inverse function of frequency; non-resonant means including in said second processing channel for imposing on said intelligence signal a phase shift the magnitude of which is a direct function of frequency and limited to 90° and an attenuation which is a direct function of frequency; means coupled with the output terminals of said first and second signal processing channels for vectorially combining the signals delivered by said channels to form a resultant signal; means responsive to said intelligence signal for sampling the values of said resultant signals during an interval in each cycle of said intelligence signal corresponding to substantially one-half the period thereof at any of its assumed values of frequency; and means coupled with said sampling means for averaging the sampled values of signal delivered by said sampling means to develop a substantially direct current signal the value of which is a function of the frequency of said intelligence signal.

3. A frequency discriminatory circuit for detecting frequency changes in a frequency modulated intelligence signal, comprising in combination: input terminal means for accepting said intelligence signal; a first and second signal processing channels each having input terminals and output terminals; means operatively connecting the input terminals of each of said signal processing channels to said input terminal means including means for inverting the signal applied to one of said channels; means operatively included in said first signal processing channel for imposing on said intelligence signal a phase shift the magnitude of which is an inverse function of frequency and an attenuation which is an inverse function of frequency; means included in said second processing channel for imposing on said intelligence signal a phase shift the magnitude of which is a direct function of frequency and an attenuation which is a direct function of frequency; means coupled with the output terminals of said first and second signal processing channels for vectorially combining the signals delivered by said channels to form a resultant signal; means responsive to said intelligence signal for sampling the values of said resultant signal during a sampling interval within each cycle of said intelligence signal of a duration corresponding to substantially one-half the period of said intelligence signal at any of its assumed values of frequency; means responsive to the frequency of said intelligence signal for advancing and retarding said sampling interval during which said resultant signal is sampled; and means coupled with said sampling means for averaging the sampled values of signal delivered by said sampling means to develop a substantially direct current signal, the value of which is a function of the frequency of said intelligence signal.

4. A frequency discriminatory circuit for detecting frequency changes in a frequency modulated intelligence signal, comprising in combination: input terminal means for accepting said intelligence signal; a first and second signal processing channels each having input terminals and output terminals; means operatively connecting the input terminals of each of said signal processing channels to said input terminal means, said connecting means including a signal inverter coupled to one channel; means operatively included in said first signal processing channel for imposing on said intelligence signal a phase shift the magnitude of which is an inverse function of frequency and an attenuation which is an inverse function of frequency; means including in said second processing channel for imposing on said intelligence signal a phase shift the magnitude of which is a direct function of frequency and an attenuation which is a direct function of frequency; means coupled with the output terminals of said first and second signal processing channels for vectorially combining the signals delivered by said channels to form a resultant signal; means responsive to the frequency of said resultant signal for shifting the phase thereof, as a function of its frequency, to develop a corrected resultant signal; and means responsive to said intelligence signal for sampling the values of said corrected resultant signal during a sampling interval in each cycle of said intelligence signal, said sampling interval being of a duration corresponding to substantially one-half the period of said intelligence signal at any of its assumed values of frequency.

5. A frequency discriminatory circuit for detecting frequency changes in a frequency modulated intelligence signal, comprising in combination: input terminal means for accepting said intelligence signal; a first and second signal processing channels each having input terminals and output terminals; means operatively connecting the input terminals of each of said signal processing channels to said input terminal means; means operatively included in said first signal processing channel for imposing on said intelligence signal a phase shift the magnitude of which is an inverse function of frequency and an attenuation which is an inverse function of frequency; means included in said second processing channel for imposing on said intelligence signal a phase shift the magnitude of which is a direct function of frequency and an attenuation which is a direct function of frequency; means coupled with the output terminals of said first and second signal processing channels for vectorially combining the signals delivered by said channels to form a resultant signal; means responsive to the frequency of said resultant signal for shifting the phase thereof as a function of its frequency to develop a corrected resultant signal; means responsive to said intelligence signal for sampling the values of said corrected resultant signal during a sampling interval in each cycle of said intelligence signal, said sampling interval being of a duration corresponding to substantially one-half the period of said intelligence signal at any of its assumed values of frequency; means responsive to the frequency of said intelligence signal for advancing and retarding the sampling intervals during which said corrected resultant signal is sampled; and means responsive to the output of said sampling means for averaging the values of said corrected resultant signal to form a substantially direct current signal the value of which is a function of the frequency of said intelligence signal.

6. A frequency discriminatory circuit for detecting frequency changes in a frequency modulated intelligence signal, comprising in combination: input terminal means for accepting said intelligence signal; a first and second signal processing channels each having input terminals and output terminals; signal inverting means in series with one of said channels; means operatively connecting the input terminals of each of said signal processing channels to said input terminal means; means operatively included in said first signal processing channel for imposing on said intelligence signal a phase shift the magnitude of which is an inverse function of frequency and an attenuation which is an inverse function of frequency; means included in said second processing channel for imposing on said intelligence signal a phase shift the magnitude of which is a direct function of frequency and an attenuation which is a direct function of frequency; means coupled with the output terminals of said first and second signal processing channels for vectorially combining the signals delivered by said channels to form a resultant signal; means responsive to the frequency of said intelligence signal for shifting the phase of said resultant signal as a direct function of frequency to produce a corrected resultant signal; means responsive to said intelligence signal for sampling the values thereof during an interval in each cycle of said corrected resultant signal corresponding to substantially one-half the period of such intelligence signal at any of its assumed values of frequency; means responsive to the frequency of said input signal for advancing the timing of the intervals during which said corrected resultant signal is sampled as a direct function of the frequency of said input signal; and means responsive to the output of said sampling means for averaging the values of said corrected resultant signal to form a substantially direct current signal the value of which is a function of the frequency of said intelligence signal.

7. A frequency discriminatory circuit for detecting changes in the frequency of an intelligence signal having a nominal frequency $f_0$ and which is modulated in frequency about said frequency $f_0$ in accordance with signal intelligence, comprising in combination: input terminals designated to accept said frequency modulated intelligence signal; a first and second separate signal processing circuits coupled with said input terminal means; means included in said first signal processing circuit for imposing amplitude attenuation on said intelligence signal which is an inverse function of frequency and imposing a phase shift upon said intelligence signal which is an inverse function of frequency, said means being operative to produce a phase shift of substantially 45° for the value of signal frequency $f_0$; means included in said second signal processing circuit for imposing amplitude attenuation on said intelligence signal which is a direct function of frequency and imposing a phase shift upon said intelligence signal which is a direct function of frequency, said means being operative to produce a phase shift of substantially 135° for the value of signal frequency $f_0$; means coupled with said first and second signal processing circuits for vectorially combining the output signals therefrom to produce a resultant signal comprised of quadrature displaced versions of said input signal; means responsive to said input signal for averaging the value of said resultant signal over successive periodically recurrent sampling intervals each of a duration corresponding to substantially one-half the period of said intelligence signal and displaced from one another by a period of substantially the same duration; and means included in said averaging means for establishing the phase relation between said sampling intervals and said intelligence signal so that the average of said resultant signal is substantially zero at a frequency substantially corresponding to $f_0$.

8. A frequency discriminatory circuit for detecting frequency changes in a frequency modulated signal having a nominal frequency $f_0$, comprising in combination: input terminals designated to accept said intelligence signal; a first and second separate signal processing circuits; means included in said first signal processing circuit comprising a high pass filter comprising the series combination of a capacitor and resistor so valued relative to each other as to produce an output signal representing a substantially 45° leading phase shift of said intelligence signal at said nominal frequency $f_0$; means included in said second signal processing circuit comprising a signal inverter and a low pass filter made up of the series combination of a resistor and capacitor so valued relative to each other as to produce an output signal representing a substantially 45° lagging phase shift of the inverted intelligence signal at said frequency $f_0$; means vectorially combining the output signals delivered by said first and second signal processing circuits to produce a resultant signal; means responsive to said input signal for cyclically sampling said resultant signal once during each full cycle of said intelligence signal and for a duration in each cycle substantially equal to one-half cycle of said input signal; and means for averaging the values of sampled information to develop an output signal having a direct current component representing the frequency value of said intelligence signal.

9. A frequency discriminatory circuit for detecting frequency changes in a frequency modulated signal having a nominal frequency $f_0$, comprising in combination: input terminals designated to accept said intelligence signal; a first and second separate signal processing circuits; means included in said first signal processing circuit comprising a high pass filter comprising the series combination of a capacitor and resistor so valued relative to each other as to produce an output signal representing a substantially 45° leading phase shift of said intelligence signal at said nominal frequency $f_0$; means included in said second signal processing circuit comprising a low pass filter made up of the series combination of a resistor and capacitor so valued relative to each other as to produce an output signal representing a substantially 45° lagging phase shift of said intelligence signal at said frequency $f_0$; means vectorially combining the output signals delivered by said first and second signal processing circuits to produce a resultant signal; a frequency relative phase shifting network coupled to said input terminal means for developing a sampling control signal, the phase of said control signal being a function of the frequency of said intelligence signal; a sampling means, responsive to said sampling control signal and said resultant signal to sample said resultant signal in response to excursions of said control signal; and means coupled with said sampling means for averaging the values of the signal samples produced by said sampling means to develop an output signal having a direct current component the magnitude of which is a function of the frequency of said intelligence signal.

10. A frequency discriminatory circuit for detecting frequency changes in a frequency modulated signal having a nominal frequency $f_0$, comprising in combination: input terminals designated to accept said intelligence signal; a first and second separate signal processing circuits; means included in said first signal processing circuit comprising a high pass filter comprising the series combination of a capacitor and resistor so valued relative to each other as to produce an output signal representing a substantially 45° leading phase shift of said intelligence signal at said nominal frequency $f_0$; means included in said second signal processing circuit comprising a low pass filter made up of the series combination of a resistor and capacitor so valued relative to each other as to produce an output signal representing a substantially 45° lagging phase shift of said intelligence signal at said frequency $f_0$; means vectorially combining the output signals delivered by said first and second signal processing circuits to produce a resultant signal; a frequency selective phase shifting network coupled with said combining means for shifting the phase of said resultant signal as a function of the frequency thereof, to produce a corrected resultant signal; sampling means responsive to a version of said intelligence signal and coupled with the output of said phase shifting network for sampling said corrected resultant signal once during each cycle of said intelligence signal; and means coupled with said sampling means for averaging the values of the signal samples produced by said sampling means to develop an output signal having a direct current component the magnitude of which is a function of the frequency of said intelligence signal.

11. A frequency discriminatory circuit for detecting frequency changes in a frequency modulated signal having a nominal frequency $f_0$, comprising in combination: input terminals designated to accept said intelligence signal; a first and second separate signal processing circuits; means included in said first signal processing circuit comprising a high pass filter comprising the series combination of a capacitor and resistor so valued relative to each other as to produce an output signal representing a substantially 45° leading phase shift of said intelligence signal at said nominal frequency $f_0$; means included in said second signal processing circuit comprising a low pass filter made up of the series combination of a resistor and capacitor so valued relative to each other as to produce an output signal representing a substantially 45° lagging phase shift of said intelligence signal at said frequency $f_0$; means vectorially combining the output signals delivered by said first and second signal processing circuits to produce a resultant signal; a frequency relative phase shifting network coupled to said input terminal means for developing a sampling control signal, the phase of said control signal being a function of the frequency of said intelligence signal; a frequency selective phase shifting network coupled with said combining means for shifting the phase of said resultant signal as a function of the frequency thereof, to produce a corrected resultant signal; sampling means responsive to said sampling control signal and said corrected resultant signal to sample said corrected resultant signal in response to excursions of said sampling control signal; and means coupled with said sampling means for averaging the values of the signal samples produced by said sampling means to develop an output signal having a direct current component the magnitude of which is a function of the frequency of said intelligence signal.

12. A frequency discriminatory circuit for detecting changes in the frequency of an intelligence carrier signal having a nominal frequency $f_1$ and modulated in frequency between the values $f_0$ and $f_2$ respectively below and above $f_1$ comprising in combination: input terminal means for accepting said modulated carrier signal; a first and second separate signal transducing means coupled with said output terminal means for developing respective output signals representing phase and amplitude modification of said carrier signal as a function of frequency; means comprised of a resistance capacitance network included in said first transducing means for establishing a transducing characteristic generally corresponding to that of a high pass filter having its half power point substantially defined at the frequency $f_1$; means comprised of a resistance capacitance network included in said second transducing means for establishing a transducing characteristic generally corresponding to that of a low pass filter having its half point substantially defined at the frequency $f_1$; means for inverting the carrier signal; means coupled with said first and second transducing means for vectorially combining the output signals therefrom to form a resultant signal; and means responsive to said inverted carrier signal for periodically sampling said resultant signal during each cycle of said carrier signal over the frequency range $f_0$—$f_2$ to develop an output signal which varies in amplitude as a function of the value of frequency assumed by said carrier signal.

13. A phase discriminatory circuit for indicating the degree of frequency change in a frequency modulated signal, comprising in combination: input terminals for receiving the frequency modulated signal, first and second signal processing channels connected to said input terminals, means included in said first signal processing channel for imposing on the input signal a phase shift and an attenuation which are inverse functions of frequency, means included in said second channel for imposing on the input signal a phase shift and an attenuation which are direct functions of frequency, signal inverting means operatively coupled to one of said channels, means connected to both of said channels for vectorially combining the output signals therefrom to form a resultant signal, dual gating means respectively responsive to the input signal and to the output of the signal inverting means for sampling the values of the resultant signal during an interval in each cycle of the input signal for any frequency thereof, and means coupled to the gating means for averaging the sampled values of signal delivered by the gating means to develop a substantially direct current signal which corresponds to the frequency variations of the input signal.

14. A frequency discriminatory circuit for indicating variations in frequency of a frequency modulated input signal comprising in combination: input terminals for receiving the frequency modulated signal; a pair of signal processing channels for imposing respective distinct phase transformations of the input signal, which transformations vary in a predetermined manner in accordance with frequency variations of the input signal; signal inverting means included in one of said channels; means for vectorially combining the output signals of said channels in order to form a resultant signal having a phase with reference to said intelligence signal which corresponds to frequency variations of the input signal; dual gating means including a pair of similarly poled diodes connected to the output of the combining means and responsive respectively to the input signal and to an inversion thereof for sampling the resultant signal in synchronism with the input signal, and means for filtering the sampled signal in order to provide a direct current signal which is indicative of the frequency variations of the input signal.

References Cited in the file of this patent

UNITED STATES PATENTS

| | | |
|---|---|---|
| 2,448,526 | Gross | Sept. 7, 1948 |
| 2,489,313 | Parker | Nov. 29, 1949 |
| 2,530,081 | Ross | Nov. 14, 1950 |
| 2,558,758 | Jaynes | July 3, 1951 |
| 2,585,532 | Briggs | Feb. 12, 1952 |
| 2,787,776 | Rudy | Apr. 2, 1957 |
| 2,888,558 | Gilman | May 26, 1959 |

OTHER REFERENCES

Pub. I, Radio-Electronics, February 1951, pp. 78 and 79.